(12) United States Patent
Sakuma et al.

(10) Patent No.: US 10,550,030 B2
(45) Date of Patent: Feb. 4, 2020

(54) OPTICAL FIBER

(71) Applicant: SUMITOMO ELECTRIC INDUSTRIES, LTD., Osaka-shi, Osaka (JP)

(72) Inventors: Hirotaka Sakuma, Yokohama (JP); Yoshiaki Tamura, Yokohama (JP); Keisei Morita, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 25 days.

(21) Appl. No.: 16/110,039

(22) Filed: Aug. 23, 2018

(65) Prior Publication Data

US 2018/0362392 A1  Dec. 20, 2018

Related U.S. Application Data

(63) Continuation of application No. PCT/JP2017/010322, filed on Mar. 15, 2017.

(30) Foreign Application Priority Data

Mar. 25, 2016 (JP) ................. 2016-062061

(51) Int. Cl.
*G02B 6/036* (2006.01)
*C03C 13/04* (2006.01)
(Continued)

(52) U.S. Cl.
CPC ........ *C03C 13/046* (2013.01); *C03B 37/0124* (2013.01); *C03B 37/01211* (2013.01); *C03B 37/01225* (2013.01); *C03B 37/01245* (2013.01); *C03B 37/01466* (2013.01); *C03B 37/01807* (2013.01); *C03B 37/01815* (2013.01); *C03B 37/01861* (2013.01); *C03B 37/01869* (2013.01); *C03C 3/06* (2013.01); *C03C 13/045* (2013.01);
(Continued)

(58) Field of Classification Search
CPC .. G02B 6/0288; G02B 6/02395; G02B 6/036; G02B 6/03694
USPC ........................................... 385/127
See application file for complete search history.

(56) References Cited

U.S. PATENT DOCUMENTS

7,088,900 B1    8/2006  Mishra
2005/0129376 A1  6/2005  Hanson et al.
(Continued)

*Primary Examiner* — Kaveh C Kianni
*Assistant Examiner* — Hung Q Lam
(74) *Attorney, Agent, or Firm* — Drinker Biddle & Reath LLP (57) ABSTRACT

Provided is an optical fiber containing an alkali metal element or the like having a smaller diffusion coefficient than K and having a low Rayleigh scattering loss. An optical fiber is composed of silica glass and includes a core and a cladding arranged to surround the core which has a lower refractive index than the core. The core includes a first core including a central axis and a second core arranged to surround the first core. The average concentration of an alkali metal element or alkaline-earth metal element in the first core is 10 mol ppm or less. The average concentration of chlorine in the first core is 2000 mol ppm or more. The average concentration of an alkali metal element or alkaline-earth metal element in the second core is 10 mol ppm or more. The average concentration of chlorine in the second core is 10 to 600 mol ppm.

10 Claims, 6 Drawing Sheets

(51) Int. Cl.
*C03B 37/012* (2006.01)
*C03C 3/06* (2006.01)
*C03B 37/018* (2006.01)
*C03B 37/014* (2006.01)

(52) U.S. Cl.
CPC ..... *G02B 6/03638* (2013.01); *G02B 6/03661* (2013.01); *G02B 6/03694* (2013.01); *C03B 2201/20* (2013.01); *C03B 2201/50* (2013.01); *C03B 2203/24* (2013.01); *C03B 2205/40* (2013.01); *C03B 2205/42* (2013.01); *C03C 2201/11* (2013.01); *C03C 2201/50* (2013.01); *C03C 2201/54* (2013.01); *C03C 2213/00* (2013.01)

(56) References Cited

U.S. PATENT DOCUMENTS

| | | | | |
|---|---|---|---|---|
| 2012/0263427 | A1* | 10/2012 | Hirano | C03B 37/01211 385/142 |
| 2013/0077925 | A1* | 3/2013 | Hirano | G02B 6/02019 385/123 |
| 2013/0188917 | A1* | 7/2013 | Hirano | G02B 6/02 385/127 |
| 2015/0370008 | A1* | 12/2015 | Tamura | C03B 37/01807 385/123 |
| 2017/0371096 | A1 | 12/2017 | Sakuma et al. | |

\* cited by examiner

OPTICAL FIBER

CROSS-REFERENCE TO RELATED APPLICATIONS

This is a continuation application of PCT/JP2017/010322 claiming the benefit of the Japanese Patent Application No. 2016-062061 filed on Mar. 25, 2016, which is incorporated by reference herein in its entirety.

TECHNICAL FIELD

The present invention relates to an optical fiber.

BACKGROUND ART

US2012/0263427A and U.S. Pat. No. 7,088,900B disclose an optical fiber having a low Rayleigh scattering loss and a low transmission loss which is a silica glass-based optical fiber that includes a core containing an alkali metal element or alkaline-earth metal element. The above optical fiber is produced by drawing an optical fiber preform that includes a core portion containing an alkali metal element or alkaline-earth metal element. Adding an alkali metal element or alkaline-earth metal element to the core portion of the optical fiber preform enables the viscosity of the core portion to be reduced when the optical fiber preform is drawn and thereby enables the network structure of silica glass to be made uniform. This reduces Rayleigh scattering loss resulting from irregularity in the structure. Hereinafter, alkali metal elements and alkaline-earth metal elements are collectively referred to as "alkali metal element or the like" unless otherwise specified.

A diffusion method is a known method for adding an alkali metal element to silica glass. In the diffusion method, while a vapor of the raw material, such as an alkali metal element or an alkali metal salt, is introduced into a silica glass-based glass pipe, the glass pipe is heated with an external heat source or a plasma is generated inside the glass pipe in order to diffuse the alkali metal element into the inner surface of the glass pipe.

After the alkali metal element has been added to a portion near the inner surface of the glass pipe, the glass pipe is heated in order to reduce the diameter of the glass pipe. Subsequent to the diameter reduction, the inner surface of the glass pipe is etched to a predetermined thickness in order to remove unwanted transition metal elements, such as Ni and Fe, which are added to the inner surface of the glass pipe as impurities simultaneously with the addition of the alkali metal element. The alkali metal element, which has a higher diffusion rate than the transition metal elements, can be retained in the inner surface of the glass pipe even after the surface of the glass pipe has been etched to the predetermined thickness in order to remove the transition metal elements. Subsequent to the etching, the glass pipe is heated to form a solid core rod including a central portion containing the alkali metal element. The core rod containing an alkali metal element and glass deposited on the outer periphery of the core rod may be used as a core portion of an optical fiber preform. An optical fiber preform is produced by synthesizing a cladding portion having a lower refractive index than the core portion on the outer periphery of the core portion including the core rod containing an alkali metal element. The optical fiber preform is melted in a high-temperature furnace and drawn to form an optical fiber by a publicly known method.

SUMMARY OF INVENTION

Technical Problem

An object of the present invention is to provide an optical fiber containing an alkali metal element or the like and having a low Rayleigh scattering loss.

Solution to Problem

An optical fiber according to the present invention is composed of silica glass and includes a core and a cladding arranged to surround the core has and having a lower refractive index than the core. The core includes a first core including a central axis and a second core arranged to surround the first core. The first core contains an alkali metal element or alkaline-earth metal element such that the average concentration of the alkali metal element or alkaline-earth metal element in the first core is 10 mol ppm or less. The first core contains chlorine such that the average concentration of chlorine in the first core is 2000 mol ppm or more. The second core contains an alkali metal element or alkaline-earth metal element such that the average concentration of the alkali metal element or alkaline-earth metal element in the second core is 10 mol ppm or more. The second core contains chlorine such that the average concentration of chlorine in the second core is 10 to 600 mol ppm.

Hereinafter, the unit "mol ppm" is used to express the number of moles of dopant atoms included in one million moles of $SiO_2$. In the case where a plurality of alkali metal elements and alkaline-earth metal elements are used, the above average concentration is calculated for each of the elements. The boundary between the first and second cores is considered to be the position at which the absolute value of the gradient of chlorine concentration with respect to radius has a local maximum.

In the optical fiber according to the present invention, the average concentration of the alkali metal element or alkaline-earth metal element in the core is preferably 300 mol ppm or less. In addition, the average concentration of chlorine in the core is preferably 15000 mol ppm or less. Moreover, the alkali metal element or alkaline-earth metal element is preferably one or two or more selected from rubidium, cesium, and calcium. The optical fiber according to the present invention preferably has a transmission loss of 0.180 dB/km or less at a wavelength of 1550 nm.

An optical fiber according to another aspect of the present invention is composed of silica glass and includes a core and a cladding arranged to surround the core has and having a lower refractive index than the core. The core includes a first core including a central axis, an intermediate core arranged to circumscribe the first core, and a second core arranged to circumscribe the intermediate core. The first core contains an alkali metal element or alkaline-earth metal element such that the average concentration of the alkali metal element or alkaline-earth metal element in the first core is 10 mol ppm or less. The first core contains chlorine such that the average concentration of chlorine in the first core is 2000 mol ppm or more. The intermediate core contains an alkali metal element or alkaline-earth metal element such that the average concentration of the alkali metal element or alkaline-earth metal element in the intermediate core is 10 mol ppm or less. The intermediate core contains chlorine such that the average concentration of chlorine in the intermediate core is 10 to 600 mol ppm. The second core contains an alkali metal element or alkaline-earth metal element such that the average concentration of the alkali metal element or alkaline-earth metal element in the second core is 10 mol ppm or more. The second core contains chlorine such that the average concentration of chlorine in the second core is 10 to 600 mol ppm.

The boundary between the first core and the intermediate core is considered to be the position at which the absolute value of the gradient of chlorine concentration with respect to radius has a local maximum. The boundary between the intermediate core and the second core is considered to be the position at which the absolute value of the gradient of the alkali metal element concentration or alkaline-earth metal element concentration with respect to radius has a local maximum, the position being closer to the center of the core than the position at which the concentration of the alkali metal element or alkaline-earth metal element has the global maximum.

In the optical fiber according to the other aspect of the present invention, the average concentration of the alkali metal element or alkaline-earth metal element in the core is preferably 300 mol ppm or less. Furthermore, the average concentration of chlorine in the core is preferably 15000 mol ppm or less.

Advantageous Effects of Invention

The optical fiber according to the present invention contains an alkali metal element or the like and has a low Rayleigh scattering loss.

DESCRIPTION OF EMBODIMENTS

Embodiments of the present invention are described below in detail with reference to the attached drawings. In the descriptions of the drawings, the same components are denoted by the same reference numeral, and duplicate descriptions are omitted. It is intended that the scope of the present invention be not limited by the following examples, but determined by the appended claims, and include all variations of the equivalent meanings and ranges to the claims.

Although potassium (K) is known as a typical alkali metal element, it is difficult to increase the average concentration of K in the core of an optical fiber, because K has a large diffusion coefficient. The inventor of the present invention produced an optical fiber that contained an alkali metal element or the like having a smaller diffusion coefficient than K and, as a result, found the following facts. In the case where a core rod including a central portion containing an alkali metal element or the like having a smaller diffusion coefficient than K was used, the alkali metal element or the like did not diffuse over the entire core even after the core rod had been heated to 2000° C. to 2300° C. in the drawing step, consequently, the viscosities of the outer peripheral portion of the core and the cladding were not reduced, and the difference between the maximum and minimum residual stresses inside the core was increased to 150 MPa or more. This resulted in the failure to reduce Rayleigh scattering loss by a sufficient degree. The transmission loss at a wavelength of 1550 nm was 0.160 dB/km or more.

One possible way to address the above issues and optimize the state of diffusion of the element is to optimize conditions such as the temperature at which the drawing step is conducted and the amount of time during which the preform is retained in the furnace. However, the conditions such as the temperature at which the drawing step is conducted and the amount of time during which the preform is retained in the furnace are determined in accordance with the size of the optical fiber preform and the drawing speed. Therefore, controlling the state of diffusion of the element by changing the above conditions unfavorably places constraints on the size of the optical fiber preform and the drawing speed, which result in constraints on the production costs and productivity.

Figure 1:
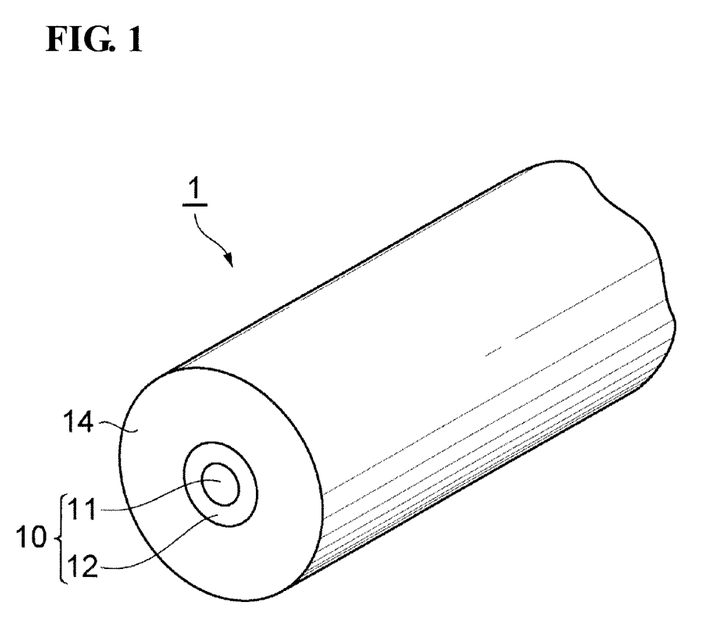
FIG. 1 is a perspective view of an optical fiber according to an embodiment of the present invention.
Figure 2:
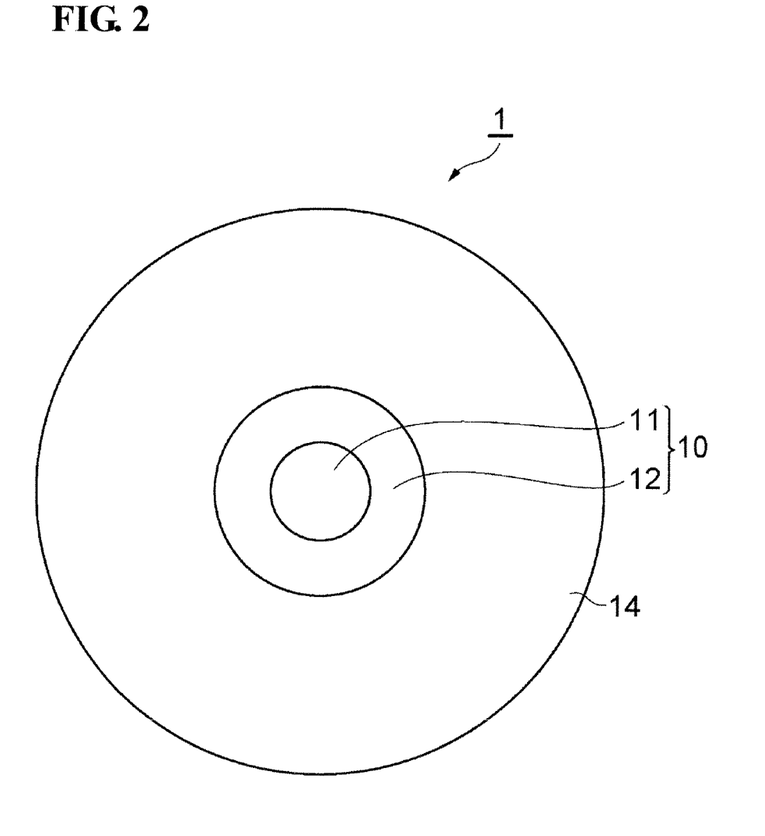
FIG. 2 is a cross-sectional view of an optical fiber according to an embodiment of the present invention.

FIG. 1 is a perspective view of an optical fiber 1 according to an embodiment of the present invention. FIG. 2 is a cross-sectional view of the optical fiber 1. The optical fiber 1 includes a core 10 composed of silica glass and a cladding 14 that is arranged to surround the core 10 and composed of silica glass. The core 10 includes a first core 11 including the central axis and a second core 12 arranged to surround the first core 11. The cladding 14 has a lower refractive index than the entirety of the core 10. In particular, the cladding 14 has a lower refractive index than the second core 12. The cladding 14 is composed of pure silica glass or silica glass containing chlorine or fluorine.

The first core 11 contains an alkali metal element or the like such that the average concentration of the alkali metal element or the like in the first core 11 is 10 mol ppm or less. The first core 11 contains chlorine such that the average concentration of chlorine in the first core 11 is 2000 mol ppm or more. The second core 12 contains an alkali metal element or the like such that the average concentration of the alkali metal element or the like in the second core 12 is 10 mol ppm or more. The second core 12 contains chlorine such that the average concentration of chlorine in the second core 12 is 10 to 600 mol ppm. The second core 12 contains an alkali metal element or the like having a diffusion coefficient equal to or larger than $1 \times 10^{-12}$ cm$^2$/s and smaller than that of K in silica glass at 2000° C. to 2300° C. The average concentration of the alkali metal element or the like in the core 10 is 300 mol ppm or less. The average concentration of chlorine in the core 10 is 15000 mol ppm or less. The refractive indices of the first and second cores can be adjusted appropriately by doping the cores with fluorine.

Setting the average concentration of chlorine in the first core 11 to be 2000 mol ppm or more prevents an increase in loss caused due to defects of the glass constituting the optical fiber. If the concentration of chlorine in the region containing an alkali metal element or the like is high, crystals are likely to be formed in the region and a suitable optical fiber may fail to be produced. Accordingly, setting the average concentration of chlorine in the second core 12 to be 600 mol ppm or less enables the production of an optical fiber that has a low loss and is resistant to failure, such as breakage of fiber. The higher the concentration of an alkali metal element or the like, the lower the loss, while the concentration of the alkali metal element or the like is lower than a specific value. However, if the concentration of the alkali metal element or the like exceeds 300 mol ppm, crystals are likely to be formed, which increase the loss. Accordingly, the average concentration of an alkali metal element or the like in the core 10 is preferably 300 mol ppm or less.

The table is a table summarizing the diffusion coefficients of Na, K, Rb, Cs, and Ca.

TABLE

| Atom | Na | K | Rb | Cs | Ca |
|---|---|---|---|---|---|
| Diffusion coefficient cm$^2$/s | $6 \times 10^{-5}$ | $4 \times 10^{-6}$ | $3 \times 10^{-6}$ | $2 \times 10^{-6}$ | $6 \times 10^{-7}$ |

Figure 3:
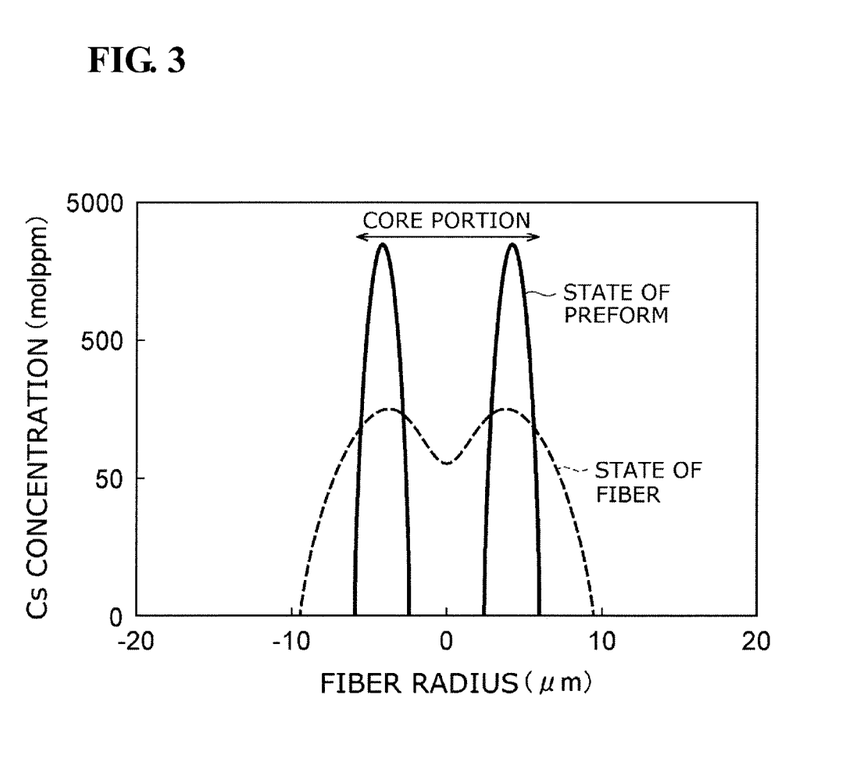
FIG. 3 is a graph illustrating the distributions of the Cs concentrations in an optical fiber preform and an optical fiber in the radial direction.

Examples of alkali metal elements and the like having a smaller diffusion coefficient than K include Rb, Cs, and Ca. FIG. 3 is a graph illustrating the distributions of Cs concentrations in an optical fiber preform and an optical fiber in the radial direction.

The optical fiber 1 contains the alkali metal element or the like having a smaller diffusion coefficient than K in order to make it possible to add the alkali metal element or the like to the core at a high concentration. This enables the viscosity of the core to be reduced compared with the case where K is used. Since the silica glass constituting the optical fiber 1 has a uniform network structure, the Rayleigh scattering loss of the optical fiber 1, which results from irregularity in the structure, can be reduced.

In the prior art, a second core portion having an average chlorine concentration of 1,000 mol ppm is arranged so as to surround a first core portion containing an alkali metal element in order to repair glass defects that may occur during drawing with chlorine and, consequently, a transmission loss of 0.154 dB/km or less at a wavelength of 1550 nm is achieved. In the production method in which the core center is doped with an alkali metal element having a smaller diffusion coefficient than K, the alkali metal element or the like does not diffuse over the entirety of the core even after the temperature has been increased to 2000° C. to 2300° C. in the drawing step, consequently, the viscosities of the outer peripheral portion of the core and the cladding portion are not reduced, and the difference between the maximum and minimum residual stresses inside the core is increased to 150 MPa or more. This results in the failure to reduce Rayleigh scattering loss by a sufficient degree. The transmission loss at a wavelength of 1550 nm is 0.160 dB/km or more.

Figure 4:
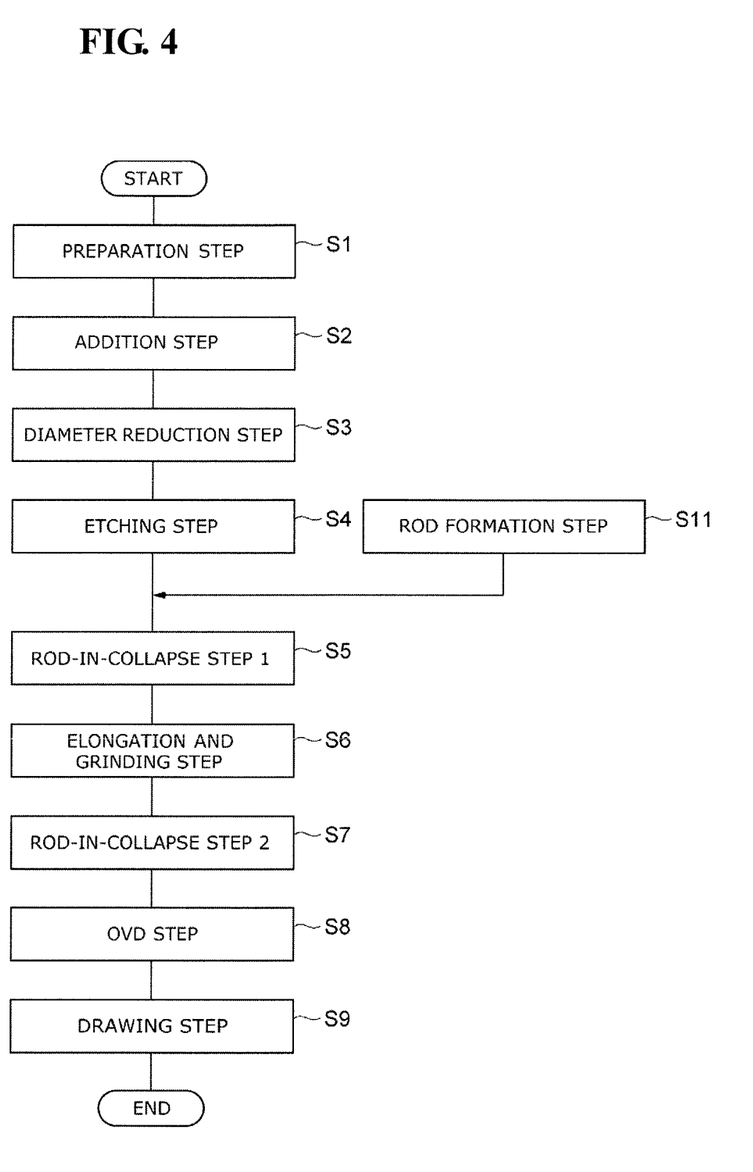
FIG. 4 is a flowchart describing a method for producing an optical fiber according to the present invention.

FIG. 4 is a flowchart describing steps for producing the optical fiber 1. The following descriptions include examples of specific conditions.

In a preparation step (Step S1), a silica glass-based glass pipe into which the alkali metal element or the like (dopant) is to be diffused is prepared. The silica glass-based glass pipe contains 100 mol ppm of chlorine, 6,000 mol ppm of fluorine, and 10 mol ppm or less of other dopants and impurities. The silica glass-based glass pipe has an outside diameter of 35 mm and an inside diameter of about 20 mm.

In an addition step (Step S2), Cs that serves as a dopant is added to the inner surface of the silica glass-based glass pipe. The raw material used is 10 g of cesium bromide (CsBr). The raw material is heated to 800° C. with an external heat source to produce a raw material vapor. While the raw material vapor and a carrier gas that is an oxygen gas having a flow rate of 1 SLM (1 liter/min in the standard state) are introduced into the silica glass-based glass pipe, the silica glass-based glass pipe is heated with an external oxyhydrogen burner such that the temperature of the outer surface of the silica glass-based glass pipe reaches 2150° C. This heating process is performed with the burner traversing at a speed of 40 mm/min to make 15 turns in total in order to diffuse the element Cs into the inner surface of the silica glass-based glass pipe.

In a diameter reduction step (Step S3), the diameter of the silica glass-based glass pipe containing Cs is reduced. In this process, while oxygen is flown inside the silica glass-based glass pipe at a flow rate of 0.5 SLM, the silica glass-based glass pipe is heated with an oxygen-hydrogen burner such that the temperature of the outer surface of the silica glass-based glass pipe reaches 2250° C. This heating process is performed with the oxygen-hydrogen burner traversing to make 6 turns in total. The diameter reduction step is conducted until the inner diameter of the silica glass pipe is reduced to 6 mm.

In an etching step (Step S4), the inner surface of the silica glass-based glass pipe is etched. In this process, while a mixed gas containing SF$_6$ (0.2 SLM) and chlorine (0.5 SLM) is introduced into the inside of the silica glass pipe, the silica glass pipe is heated with an external heat source in order to perform gas phase etching. This makes it possible to grind the inner surface of the pipe which contains high concentrations of the unwanted impurities added to the pipe together with the desired dopant and to thereby remove the impurities.

In a rod formation step (Step S11), the outer periphery of a transparent glass rod that is composed of silica glass containing chlorine such that the average concentration of chlorine in the silica glass is 4000 mol ppm is ground such that the diameter of the glass rod is reduced to 5.0 mm. Hereby, a rod is prepared.

In a rod-in-collapse step 1 (Step S5), the rod prepared in Step S11 is inserted into the glass pipe prepared in Step S4. While a mixed gas containing oxygen (0.1 SLM) and He (1 SLM) is introduced into the inside of the silica glass pipe under atmospheric pressure and the absolute pressure inside the silica glass pipe is reduced to 97 kPa or less, the surface temperature is increased to 2150° C. in order to integrate the rod and the pipe into a solid-core rod. Hereby, a core portion (outside diameter: 25 mm) is prepared by the above solidification process. A core layer that does not contain the alkali metal element or the like may optionally be disposed on the outer periphery of the rod by any publicly known method, such as an OVD method or a collapse method.

In an elongation and grinding step (Step S6), the core portion is elongated such that the diameter of the core portion is reduced to 24 mm. The outer periphery of the elongated core portion is ground such that the diameter of the core portion is reduced to 17 mm.

In a rod-in-collapse step 2 (Step S7), a cladding portion is formed on the outer periphery of the core portion. In this process, a rod-in-collapse method is used, that is, the core portion is inserted into the inside of a silica glass-based glass pipe containing fluorine and the core portion and the glass pipe are heated with an external heat source so as to be integrated into a single member. The relative difference in refractive index between the core portion and the cladding portion is about 0.34% at maximum. The synthesis performed by the rod-in-collapse method enables the moisture contents in the core portion and a part of the cladding portion which is in the vicinity of the core portion to be reduced to a sufficiently low level.

In an OVD step (Step S8), the rod produced by integrating the core portion and the cladding portion is elongated in order to reduce the diameter of the rod to a predetermined diameter. Subsequently, a jacket portion containing fluorine is synthesized on the outer periphery of the rod by an OVD method. Hereby, an optical fiber preform is prepared. The refractive index of the jacket portion is preferably equal to that of the cladding portion and may be different from that of the cladding portion.

In a drawing step (Step S9), the optical fiber preform prepared by the method for producing an optical fiber preform, which is described above, is drawn to form an optical fiber. The drawing speed is 1,800 to 2,300 m/min. The drawing tension is 0.5 N. The measurement of the dopant concentration in the drawn optical fiber confirmed that the average Cs concentration in the core was 210 mol ppm. The transmission loss of the optical fiber according to this embodiment can be reduced to 0.148 dB/km at a wavelength of 1550 nm, while the transmission loss of the optical fiber produced in the prior art is 0.158 dB/km at best.

Figure 5:
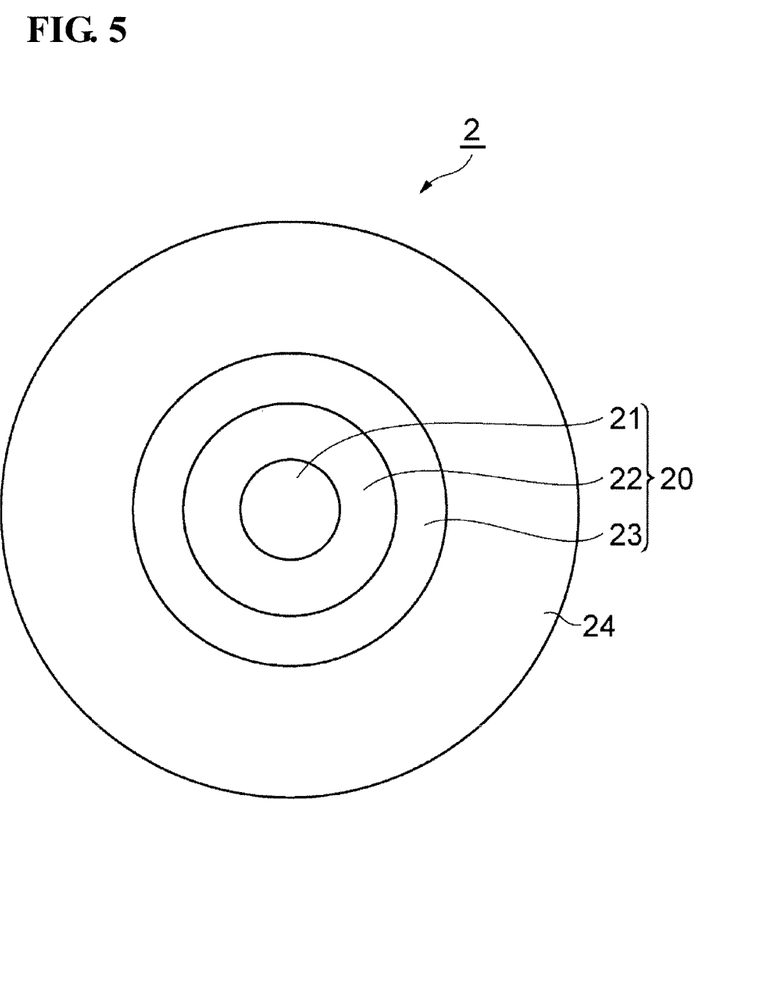
FIG. 5 is a cross-sectional view of an optical fiber according to another embodiment of the present invention.

FIG. 5 is a cross-sectional view of an optical fiber 2 according to another embodiment. The optical fiber 2 includes a core 20 composed of silica glass and a cladding 24 that is arranged to surround the core 20 and composed of silica glass. The core 20 includes at least a first core 21 including the central axis, an intermediate core 22 arranged to circumscribe the first core 21, and a second core 23 arranged to circumscribe the intermediate core 22. The cladding 24 has a lower refractive index than the second core 23. The cladding 24 is composed of pure silica glass or silica glass containing chlorine or fluorine.

The first core 21 contains an alkali metal element or alkaline-earth metal element such that the average concentration of the alkali metal element or alkaline-earth metal element in the first core 21 is 10 mol ppm or less. The first core 21 contains chlorine such that the average concentration of chlorine in the first core 21 is 2000 mol ppm or more. The intermediate core 22 contains an alkali metal element or alkaline-earth metal element such that the average concentration of the alkali metal element or alkaline-earth metal element in the intermediate core 22 is 10 mol ppm or less. The intermediate core 22 contains chlorine such that the average concentration of chlorine in the intermediate core 22 is 10 to 600 mol ppm. The second core 23 contains an alkali metal element or alkaline-earth metal element such that the average concentration of the alkali metal element or alkaline-earth metal element in the second core 23 is 10 mol ppm or more. The second core 23 contains chlorine such that the average concentration of chlorine in the second core 23 is 10 to 600 mol ppm. The second core 23 contains an alkali metal element or the like (e.g., Rb, Cs, or Ca) having a diffusion coefficient equal to or larger than $1\times10^{-12}$ cm$^2$/s and smaller than that of K in silica glass at 2000° C. to 2300° C. The average concentration of the alkali metal element or the like in the core 20 is 300 mol ppm or less. The average concentration of chlorine in the core 20 is 15000 mol ppm or less. The refractive indices of the first core, the intermediate core, and the second core can be adjusted appropriately by doping the cores with fluorine.

Since the optical fiber 2 includes the intermediate core 22 interposed between the first core 21 and the second core 23, the intermediate core 22 serving as a buffer zone having low concentrations of chlorine and the alkali metal element or the like, the optical fiber 2 has a lower loss than the optical fiber 1 in a consistent manner.

Figure 6:
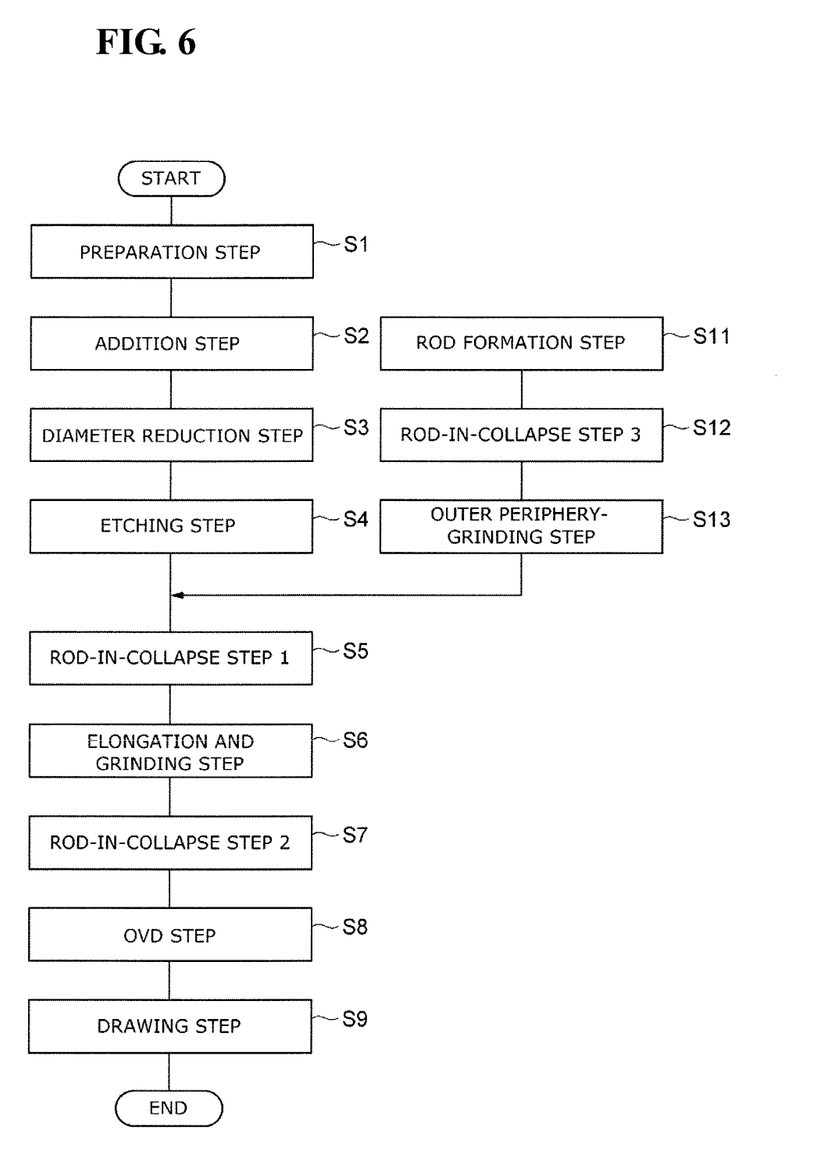
FIG. 6 is a flowchart describing a method for producing an optical fiber according to another embodiment of the present invention.

FIG. 6 is a flowchart describing steps for producing the optical fiber 2. The following descriptions include examples of specific conditions. The flowchart illustrated in FIG. 7 is different from that illustrated in FIG. 5 in that the flowchart illustrated in FIG. 7 further includes a rod-in-collapse step 3 (Step S12) and an outer periphery-grinding step (Step S13).

In the rod-in-collapse step 3 (Step S12), the rod prepared in Step S11 is inserted into a transparent glass pipe that is composed of silica glass containing chlorine such that the average chlorine concentration in the silica glass is 300 mol ppm and has an outside diameter of 25 mm and an inside diameter of 6 mm. The rod and the glass pipe are integrated into another rod.

In the outer periphery-grinding step (Step S13), the other rod is elongated such that the diameter of the rod is reduced to 16 mm. The outer periphery of the elongated rod is ground such that the diameter of the rod is reduced to 6 mm.

In the rod-in-collapse step 1 (Step S5), the rod prepared in Step S13 is inserted into the glass pipe prepared in Step S4. The rod and the glass pipe are integrated into a solid-core rod.

The invention claimed is:

1. An optical fiber composed of silica glass, the optical fiber comprising:
a core including a first core including a central axis and a second core arranged to surround the first core, the first core containing an alkali metal element or alkaline-earth metal element such that the average concentration of the alkali metal element or alkaline-earth metal element in the first core is 10 mol ppm or less, the first core containing chlorine such that the average concentration of chlorine in the first core is 2000 mol ppm or more, the second core containing an alkali metal element or alkaline-earth metal element such that the average concentration of the alkali metal element or alkaline-earth metal element in the second core is larger than the average concentration of the alkali metal element or alkaline-earth metal element in the first core and 10 mol ppm or more, the second core containing chlorine such that the average concentration of chlorine in the second core is smaller than the average concentration of the chlorine in the first core and 10 to 600 mol ppm; and
a cladding arranged to surround the core, the cladding having a lower refractive index than the core.

2. The optical fiber according to claim 1,
wherein the average concentration of an alkali metal element or alkaline-earth metal element in the core is 300 mol ppm or less.

3. The optical fiber according to claim 1,
wherein the average concentration of chlorine in the core is 15000 mol ppm or less.

4. The optical fiber according to claim 1,
wherein the alkali metal element or alkaline-earth metal element is one or two or more selected from rubidium, cesium, and calcium.

5. The optical fiber according to claim 1,
the optical fiber having a transmission loss of 0.180 dB/km or less at a wavelength of 1550 nm.

6. An optical fiber composed of silica glass, the optical fiber comprising:
a core including a first core including a central axis, an intermediate core arranged to circumscribe the first core, and a second core arranged to circumscribe the intermediate core, the first core containing an alkali metal element or alkaline-earth metal element such that the average concentration of the alkali metal element or alkaline-earth metal element in the first core is 10 mol ppm or less, the first core containing chlorine such that the average concentration of chlorine in the first core is 2000 mol ppm or more, the intermediate core containing an alkali metal element or alkaline-earth metal element such that the average concentration of the alkali metal element or alkaline-earth metal element in the intermediate core is 10 mol ppm or less, the intermediate core containing chlorine such that the average concentration of chlorine in the intermediate core is 10 to 600 mol ppm, the second core containing an alkali metal element or alkaline-earth metal element such that the average concentration of the alkali metal element or alkaline-earth metal element in the second core is larger than the average concentration of the alkali metal element or alkaline-earth metal element in the first core and 10 mol ppm or more, the second core containing chlorine such that the average concentration of chlorine in the second core is smaller than the average concentration of the chlorine in the first core and 10 to 600 mol ppm; and a cladding arranged to surround the core, the cladding having a lower refractive index than the core.

7. The optical fiber according to claim 6, wherein the average concentration of an alkali metal element or alkaline-earth metal element in the core is 300 mol ppm or less.

8. The optical fiber according to claim 6,
wherein the average concentration of chlorine in the core is 15000 mol ppm or less.

9. The optical fiber according to claim 6,
wherein the alkali metal element or alkaline-earth metal element is one or two or more selected from rubidium, cesium, and calcium.

10. The optical fiber according to claim 6,
the optical fiber having a transmission loss of 0.180 dB/km or less at a wavelength of 1550 nm.

* * * * *